US012697586B2

(12) United States Patent
Tomescu et al.

(10) Patent No.: US 12,697,586 B2
(45) Date of Patent: *Aug. 4, 2026

(54) FORMED SHEET MEMBRANE ELEMENT AND FILTRATION SYSTEM

(71) Applicant: FIBRACAST LTD., Hannon (CA)

(72) Inventors: Ionel Tomescu, Ancaster (CA); Rafael Simon, Pacific Palisades, CA (US)

(73) Assignee: Fibracast Ltd., Hannon (CA)

(*) Notice: Subject to any disclaimer, the term of this patent is extended or adjusted under 35 U.S.C. 154(b) by 374 days.

This patent is subject to a terminal disclaimer.

(21) Appl. No.: 18/126,024

(22) Filed: Mar. 24, 2023

(65) Prior Publication Data

US 2023/0256391 A1 Aug. 17, 2023

Related U.S. Application Data

(63) Continuation of application No. 16/654,659, filed on Oct. 16, 2019, now Pat. No. 11,642,628, which is a
(Continued)

(51) Int. Cl.
*B01D 61/18* (2006.01)
*B01D 63/06* (2006.01)
(Continued)

(52) U.S. Cl.
CPC ........... *B01D 61/18* (2013.01); *B01D 63/061* (2013.01); *B01D 63/081* (2013.01);
(Continued)

(58) Field of Classification Search
CPC ........ B01D 2313/041; B01D 2313/042; B01D 2313/146; B01D 2313/21; B01D 2315/06;
(Continued)

(56) References Cited

U.S. PATENT DOCUMENTS 2,576,864 A 11/1951 Valente
2,789,530 A 4/1957 Fleischauer
(Continued)

FOREIGN PATENT DOCUMENTS

CN 1220616 A 6/1999
CN 2339604 Y 9/1999
(Continued)

OTHER PUBLICATIONS

Wtizko, English machine translation DE 19639964 A1, pp. 1-7 (Year: 1998).*
(Continued)

*Primary Examiner* — Claire A Norris
(74) *Attorney, Agent, or Firm* — Borden Ladner Gervais LLP; Michael Damiani

(57) ABSTRACT

A piece of substrate material is formed under heat and pressure against a cavity into a shaped substrate sheet having one or more depressions. Two substrate sheets are bonded together to form a substrate wherein the one or more depressions form one or more interior channels. The substrate, if not formed with pre-coated substrate material, is coated with a dope and quenched to form a filtering membrane. A plurality of membranes may be placed side by side to form a bundle with permeating ends of the membrane, which are open to the one or more interior channels, separated by gaps or spacers. The bundle is connected to a header to produce a module. The module can be assembled into a cassette.

19 Claims, 15 Drawing Sheets

Related U.S. Application Data continuation of application No. 13/641,589, filed as application No. PCT/CA2011/050201 on Apr. 15, 2011, now Pat. No. 9,492,792.

(60) Provisional application No. 61/325,972, filed on Apr. 20, 2010.

(51) Int. Cl.

| | |
|---|---|
| *B01D 63/08* | (2006.01) |
| *B01D 65/02* | (2006.01) |
| *B01D 69/04* | (2006.01) |
| *B01D 69/06* | (2006.01) |
| *B01D 69/12* | (2006.01) |
| *B05D 1/26* | (2006.01) |
| *B29C 51/00* | (2006.01) |
| *B29C 51/26* | (2006.01) |
| *B29D 99/00* | (2010.01) |
| *B31D 5/00* | (2017.01) |
| *B32B 1/00* | (2006.01) |
| *B32B 3/28* | (2006.01) |
| *B32B 5/02* | (2006.01) |
| *B32B 5/26* | (2006.01) |
| *B32B 7/04* | (2019.01) |
| *B32B 7/05* | (2019.01) |
| *B32B 7/12* | (2006.01) |
| *B32B 27/12* | (2006.01) |
| *B32B 37/00* | (2006.01) |
| *B29L 31/00* | (2006.01) |
| *B29L 31/14* | (2006.01) |

(52) U.S. Cl.
CPC ......... *B01D 63/082* (2013.01); *B01D 65/022* (2013.01); *B01D 69/04* (2013.01); *B01D 69/06* (2013.01); *B01D 69/12* (2013.01); *B05D 1/26* (2013.01); *B29C 51/004* (2013.01); *B29C 51/266* (2013.01); *B29D 99/005* (2013.01); *B31D 5/0082* (2013.01); *B32B 1/00* (2013.01); *B32B 3/28* (2013.01); *B32B 5/022* (2013.01); *B32B 5/26* (2013.01); *B32B 7/04* (2013.01); *B32B 7/05* (2019.01); *B32B 7/12* (2013.01); *B32B 27/12* (2013.01); *B32B 37/0076* (2013.01); *B01D 65/02* (2013.01); *B01D 2313/041* (2022.08); *B01D 2313/042* (2022.08); *B01D 2313/146* (2013.01); *B01D 2313/21* (2013.01); *B01D 2315/06* (2013.01); *B01D 2323/42* (2013.01); *B01D 2325/06* (2013.01); *B29L 2031/14* (2013.01); *B29L 2031/755* (2013.01); *B32B 2262/0261* (2013.01); *B32B 2262/0276* (2013.01); *B32B 2305/20* (2013.01); *B32B 2307/724* (2013.01); *B32B 2307/732* (2013.01); *B32B 2607/00* (2013.01)

(58) Field of Classification Search
CPC  B01D 2323/42; B01D 2325/06; B01D 61/18; B01D 63/061; B01D 63/081; B01D 63/082; B01D 65/02; B01D 65/022; B01D 69/04; B01D 69/06; B01D 69/12; B05D 1/26; B29C 51/004; B29C 51/266; B32B 1/00; B32B 2262/0261; B32B 2262/0276; B32B 2305/20; B32B 2307/724; B32B 2307/732; B32B 2607/00; B32B 27/12; B32B 3/28; B32B 37/0076; B32B 5/022; B32B 5/26; B32B 7/04; B32B 7/05; B32B 7/12

USPC .................................................. 210/346, 490
See application file for complete search history.

(56) References Cited

U.S. PATENT DOCUMENTS

| | | | |
|---|---|---|---|
| 3,208,898 | A | 9/1965 | Chavannes et al. |
| 3,401,798 | A | 9/1968 | Nyrop |
| 3,620,375 | A | 11/1971 | Jack |
| 3,725,985 | A | 4/1973 | Yarber |
| 3,734,659 | A | 5/1973 | Harris |
| 3,849,050 | A | 11/1974 | Rutherford et al. |
| 3,887,320 | A | 6/1975 | Erlewine et al. |
| 4,155,792 | A | 5/1979 | Gelhaar et al. |
| 4,258,093 | A | 3/1981 | Benedyk |
| 4,327,130 | A | 4/1982 | Pipkin |
| 4,451,370 | A | 5/1984 | Murai et al. |
| 4,510,010 | A | 4/1985 | Schramm et al. |
| 4,555,342 | A | 11/1985 | Grant |
| 4,589,983 | A | 5/1986 | Wydevan |
| 4,636,309 | A | 1/1987 | Bellhouse |
| 4,756,835 | A | 7/1988 | Wilson |
| 5,002,666 | A | 3/1991 | Matsumoto et al. |
| 5,240,540 | A | 8/1993 | Matsumoto et al. |
| 5,246,474 | A | 9/1993 | Greatorex |
| 5,296,065 | A | 3/1994 | Greatorex |
| 5,482,625 | A | 1/1996 | Shimizu et al. |
| 5,651,888 | A | 7/1997 | Shimizu et al. |
| 5,772,831 | A | 6/1998 | Moro et al. |
| 5,788,862 | A | 8/1998 | Degen et al. |
| 5,882,407 | A | 3/1999 | Takeno et al. |
| 5,975,706 | A | 11/1999 | Nakayama |
| 6,010,560 | A * | 1/2000 | Witzko ................. B29C 65/223 |
| | | | 96/8 |
| 6,110,249 | A | 8/2000 | Medcalf et al. |
| 6,224,706 | B1 | 5/2001 | Matich |
| 6,273,938 | B1* | 8/2001 | Fanselow ........... B01D 46/0036 |
| | | | 55/497 |
| 6,280,824 | B1 | 8/2001 | Insley, I et al. |
| 6,287,467 | B1 | 9/2001 | Nagano et al. |
| 6,376,012 | B1 | 4/2002 | Innes et al. |
| 6,544,590 | B1 | 4/2003 | Kodera et al. |
| 6,773,590 | B2 | 8/2004 | Prutkin |
| 6,843,908 | B2 | 1/2005 | Okajima et al. |
| 7,083,729 | B2 | 8/2006 | Vellinga |
| 7,380,774 | B2 | 6/2008 | Akita et al. |
| 9,492,792 | B2 * | 11/2016 | Tomescu ................... B32B 7/04 |
| 10,105,651 | B2 | 10/2018 | Tomescu et al. |
| 10,478,777 | B2 * | 11/2019 | Tomescu ................ B01D 69/04 |
| 11,154,817 | B2 | 10/2021 | Tomescu et al. |
| 11,642,628 | B2 | 5/2023 | Tomescu et al. |
| 2002/0121339 | A1 | 9/2002 | Ikeda et al. |
| 2002/0172802 | A1 | 11/2002 | Weder |
| 2004/0045890 | A1* | 3/2004 | Herczeg ................ B01D 65/00 |
| | | | 210/321.89 |
| 2004/0112213 | A1 | 6/2004 | Dominiak et al. |
| 2006/0163150 | A1 | 7/2006 | Golden et al. |
| 2007/0039296 | A1 | 2/2007 | Schrage et al. |
| 2007/0251940 | A1 | 11/2007 | Hennessey |
| 2008/0134912 | A1 | 6/2008 | Golan |
| 2008/0156730 | A1 | 7/2008 | Heinen |
| 2009/0223187 | A1 | 9/2009 | Nelson et al. |
| 2010/0218471 | A1 | 9/2010 | Smithies et al. |
| 2011/0171377 | A1 | 7/2011 | Mues et al. |
| 2012/0181722 | A1 | 7/2012 | Morita et al. |
| 2021/0275970 | A1 | 9/2021 | Tomescu et al. |
| 2022/0410069 | A1 | 12/2022 | Tomescu et al. |
| 2023/0072707 | A1 | 3/2023 | Nishimura et al. |

FOREIGN PATENT DOCUMENTS

| | | |
|---|---|---|
| CN | 1450930 A | 10/2003 |
| CN | 1496286 A | 5/2004 |
| CN | 1575196 A | 2/2005 |
| CN | 1623636 A | 6/2005 |
| CN | 1890016 A | 1/2007 |
| CN | 101306277 A | 11/2008 |

(56) References Cited

FOREIGN PATENT DOCUMENTS

| | | | | |
|---|---|---|---|---|
| CN | 102046302 | A | 5/2011 | |
| DE | 8907667 | U1 | 3/1990 | |
| DE | 19639964 | A1 * | 4/1998 | ........ B01D 63/0231 |
| EP | 0439352 | A2 | 7/1991 | |
| EP | 0692293 | A1 | 1/1996 | |
| EP | 2223725 | A1 | 9/2010 | |
| JP | S54130646 | A | 10/1979 | |
| JP | H0418923 | A | 1/1992 | |
| JP | H0768693 | A | 3/1995 | |
| JP | H07256174 | A | 10/1995 | |
| JP | 2001111203 | A | 4/2001 | |
| JP | 2003528711 | A | 9/2003 | |
| JP | 2008012799 | A | 1/2008 | |
| WO | 8605413 | A1 | 9/1986 | |
| WO | 9517242 | A1 | 6/1995 | |
| WO | 9636757 | A2 | 11/1996 | |
| WO | 9947335 | A1 | 9/1999 | |
| WO | 0170375 | A1 | 9/2001 | |
| WO | 2007036332 | A2 | 4/2007 | |
| WO | 2009135529 | A1 | 11/2009 | |
| WO | 2009147086 | A1 | 12/2009 | |
| WO | 2011043228 | A1 | 4/2011 | |
| WO | 2011130853 | A1 | 10/2011 | |

OTHER PUBLICATIONS

Canadian Patent Application No. 2,796,531, Office Action dated Sep. 27, 2017.
Canadian Patent Application No. 2,852,773, Office Action Dated Aug. 12, 2021.
Canadian Patent Application No. 2,852,773, Office Action Dated Apr. 28, 2022.
Canadian Patent Application No. 2,852,773, Office Action dated Apr. 17, 2023.
Canadian Patent Application No. 2,852,773, Office Action dated Jan. 29, 2021.
Canadian Patent Application No. 2,852,773, Office Action dated Mar. 6, 2020.
Canadian Patent Application No. 2,852,773, Office Action dated Oct. 12, 2018.
Canadian Patent Application No. 3,018,461, Notice of Allowance dated Feb. 16, 2021.
Canadian Patent Application No. 3,018,461, Office Action dated Jul. 10, 2020.
Chinese Patent Application No. 201180024419.5, Invalidation Petitiondated Sep. 21, 2018—English Translation Available.
Chinese Patent Application No. 201180024419.5,Supplemental Observationsdated Oct. 18, 2018—English Translation Available.
Chinese Patent Application No. 201280062722.9, Fourth OA dated Mar. 6, 2017.
Chinese Patent Application No. 201280062722.9, Office Action dated Aug. 6, 2015—With Translation.
Chinese Patent Application No. 201280062722.9, Office Action dated Mar. 30, 2016—With Translation.
Chinese Patent Application No. 201280062722.9, Office Action dated Sep. 19, 2016—With Translation.
Chinese Patent Application No. 201710881355.X, Office Action dated Dec. 15, 2020—English Translation available.
Chinese Patent Application No. 201710881355.X, Office Action dated Mar. 23, 2021—English Translation available.
Chinese Patent Application No. 201710881355.X, Office Action dated Sep. 15, 2020—English Translation not available.
Chinese Patent Application No. CN201180024419.5, Examination Decision on Request for Invalidation dated Mar. 14, 2019.
Dainippon Plastics Co Ltd, English Language Abstract of JP07256174 published Oct. 9, 1995.
Doyen et al., "Spacer-Fabric Supported Membranes: A Superior Type of Submerged Flat Sheet MBR Technology," ACHEMA Conference, May 15, 2009, 2 pages.
English Translation of Chinese Patent Application No. 201710881355. X, Office Action dated Apr. 13, 2020.
English Translation of Chinese Patent Application No. 201710881355. X, Office Action dated Sep. 23, 2020.
European Patent Application No. 11771458, Supplementary European Search Report dated Dec. 17, 2013.
European Patent Application No. 11771458.4, Communication pursuant to Article 94(3) EPC dated Mar. 11, 2021.
European Patent Application No. 11771458.4, Communication pursuant to Article 94(3) EPC dated Oct. 30, 2017.
European Patent Application No. 117714584, Office Action dated Apr. 12, 2017.
European Patent Application No. 11771458.4, Office Action dated Jun. 8, 2018.
European Patent application No. 12841184, Supplementary European Search Report dated Aug. 4, 2015.
European Patent Application No. 12841184.0, Office Action dated Dec. 10, 2019.
European Patent Application No. 12841184.0, Office Action dated Dec. 13, 2022.
European Patent Application No. 12841184.0, Office Action dated Jun. 20, 2022.
European Patent Application No. 12841184.0, Partial European Search Report dated May 15, 2015.
European Patent Application No. EP11771458.4, Communication pursuant to Article 94(3) EPC dated Aug. 7, 2019.
European Patent Application No. 11771458.4, Office Action dated Feb. 16, 2022.
Gore W L & ASS GMBH, English Language abstract of DE19639964 published Apr. 2, 1998.
International Patent Application No. PCT/CA2011/050201, International Preliminary Report on Patentability dated Nov. 1, 2012.
International Patent Application No. PCT/CA2011/050201, International Search Report and Written Opinion dated Jul. 20, 2011.
International Patent Application No. PCT/CA2012/050742, International Preliminary Report on Patentability dated May 1, 2014.
International Patent Application No. PCT/CA2012/050742, International Search Report and Written Opinion dated Jan. 17, 2013.
Korean Patent Application No. 10-2014-7013562, Office Action dated Aug. 20, 2018—English Translation Available.
Korean Patent Application No. 10-2014-7013562, Office Action dated Feb. 28, 2019—English Translation Available.
Korean Patent Application No. 10-2018-7023892, Office Action dated Nov. 1, 2018—English Translation Available.
Korean Patent Application No. KR10-2012-7030408, Office Action dated Feb. 21, 2018—English Translation Available.
Korean Patent Application No. KR10-2012-7030408, Office Action dated Oct. 31, 2017—English Translation available.
Korean Patent Application No. KR1020197014735, Office Action dated Jun. 17, 2019—English Translation Available.
Korean Patent Application No. KR1020207014234, Office Action dated Aug. 19, 2020—English Translation Not Available.
Matsushita Electric Works Ltd, English Language Abstract of JPS54-130646 published Oct. 11, 1979.
MICRODYN-NADIR GmbH, The Art to Clear Solutions, publication date unknown.
Nielsen et al., "Mechanical Properties of Polymers and Composites," CRC Press, 2nd Edition, 1994, pp. 337.
European Patent Application No. 23160288.9, Extended European Search Report dated Jun. 5, 2024.
European Patent Application No. 23160288.9, Partial European Search Report dated Mar. 15, 2024.
U.S. Appl. No. 17/325,452, Notice of Allowance dated Apr. 9, 2024.
Nippon Mektron KK, English Language Abstract of JP2001111203 published Apr. 20, 2001.
U.S. Appl. No. 13/654,918, Non-Final Office Action dated Oct. 6, 2017.
U.S. Appl. No. 13/654,918, Notice of Allowance dated Jun. 14, 2018.
U.S. Appl. No. 13/654,918, Notice of Allowance dated Sep. 26, 2018.
U.S. Appl. No. 15/294,601, Non-Final Office Action dated Feb. 25, 2019.

(56)         References Cited

OTHER PUBLICATIONS

U.S. Appl. No. 15/294,601, Notice of allowance dated Oct. 16, 2019.
U.S. Appl. No. 15/294,601, Notice of allowance dated Feb. 25, 2019.
U.S. Appl. No. 15/294,601, Restriction Requirement dated Oct. 18, 2018.
U.S. Appl. No. 16/129,063, Non-Final Office Action dated May 15, 2020.
U.S. Appl. No. 16/129,063, Notice of Allowance dated Aug. 23, 2021.
U.S. Appl. No. 16/129,063, Notice of Allowance dated Feb. 16, 2021.
U.S. Appl. No. 16/129,063, Notice of Allowance dated Jun. 8, 2021.
U.S. Appl. No. 16/654,659, Advisory Action dated Nov. 8, 2021.
U.S. Appl. No. 16/654,659, Final office Action dated Jun. 24, 2022.
U.S. Appl. No. 16/654,659, Final Office Action dated Sep. 3, 2021.
U.S. Appl. No. 16/654,659, Non-Final Office Action dated Jan. 14, 2022.
U.S. Appl. No. 16/654,659, Notice of Allowance dated Dec. 27, 2022.
U.S. Appl. No. 16/654,659, Restriction Requirement dated Oct. 30, 2020.

U.S. Appl. No. 17/325,452, Non-Final office Action dated May 15, 2023.
U.S. Appl. No. 17/895,209, Non-Final office Action dated May 15, 2023.
U.S. Appl. No. 16/654,659, Non-Final Office Action dated Apr. 12, 2021.
Canadian Patent Application No. 3175636, Office Action dated Dec. 15, 2023.
Chinese Patent Application No. 201710881355, Office Action dated Dec. 26, 2023—English Translation available.
U.S. Appl. No. 17/325,452, Final office Action dated Sep. 13, 2023.
U.S. Appl. No. 17/325,452, Notice of Allowance dated Nov. 17, 2023.
Canadian Patent Application No. 3175636, Office Action dated Aug. 19, 2024.
European Patent Application No. 23160288.9, Office Action dated Apr. 14, 2025.
European Patent Application No. 12841184.0, Office Action dated Nov. 17, 2025.
Canadian Patent Application No. 2,852,773, Examiner's Report dated Feb. 25, 2026.

* cited by examiner

FORMED SHEET MEMBRANE ELEMENT AND FILTRATION SYSTEM

CROSS REFERENCE TO RELATED APPLICATIONS

This application is a continuation of U.S. application Ser. No. 16/654,659, filed Oct. 16, 2019, which is a continuation of U.S. application Ser. No. 13/641,589, filed Dec. 21, 2012, which is a National Stage Entry of International Application No. PCT/CA2011/050201, filed Apr. 15, 2011, which is a non-provisional application of U.S. Application Ser. No. 61/325,972, filed Apr. 20, 2010. U.S. application Ser. No. 16/654,659; U.S. application Ser. No. 13/641,589; International Application No. PCT/CA2011/050201 and U.S. Application Ser. No. 61/325,972 are incorporated by reference.

FIELD

This specification relates to devices for membrane separation and methods of making them, and in particular to microfiltration (MF), ultrafiltration (UF) or nanofiltration (NF) membrane elements or modules suitable for immersed, alternatively called submerged, operation.

BACKGROUND

The following is not an admission that anything discussed below is common general knowledge or citable as prior art.

Immersed MF or UF membranes may be made in a flat sheet, alternatively called plate and frame, configuration. In this configuration, a roll of membrane sheet is made by casting a polymeric separation layer cast onto a roll of non-woven substrate. Two generally rectangular pieces of membrane sheet are attached at their edges, for example by supersonic welding, onto opposing sides of hollow plastic frame. This creates a panel with a hollow interior channel to collect filtered water, alternatively called permeate. Several panels slide side by side into a frame that can be immersed in water to be filtered. The insides of the panels are connected to the suction side of a pump to draw permeate through the membrane sheets. Bubbles provided from below the frame cause a mixed flow of bubbles and liquid to rise through vertical slots between the panels to held clean the membrane surfaces. Examples of this type of device are shown in U.S. Pat. Nos. 5,482,625; 5,651,888; 5,772,831; 6,287,467; and, 6,843,908, all owned by Kubota Corporation.

Flat sheet membrane modules are generally robust and have a low manufacturing cost (relative to hollow fiber membranes) because they can be cast in a wide sheet. However, flat sheet membranes have poor packing densities (membrane surface area per unit volume of the module) relative to hollow fiber membranes and so the total cost of a large flat sheet plant can be very high. Further, typical flat sheet membrane panels cannot be backwashed vigorously enough to clean the membranes mechanically.

A variation of a flat sheet membrane element is shown in International Publication Number WO 2007/036332 to Microdyn-Nadir GMBH. In these elements, two layers of membrane material are cast onto the front and back sides of a fabric having a porous central area between two dense layers. The central area provides a permeate channel also connects the two dense layers together allowing the element to be backwashed for mechanical cleaning. These elements do not require a four-sided frame and they are about 2 mm thick, which is thinner than the plate and frame elements described above. However, these elements are also flexible and they are spaced apart by about 10 mm center to center in a frame. The packing density is better than for the plate and frame elements described above, but still much lower than a hollow fiber membrane module. The central area of the fabric, although porous, also provides a resistance against flow in the permeate channel and increases the cost of the element.

INTRODUCTION

The following introduction is intended to introduce the reader to the detailed description to follow and not to limit or define any claimed invention.

A piece of substrate material, for example a non-woven fabric, is formed under heat and pressure, for example against the inner surface of a mold cavity, into a shaped substrate sheet having one or more depressions, for example a series of generally parallel depressions, relative to a plane. Two substrate sheets, at least one of which has depressions, are bonded together, for example along or beside the edges of the depressions. Optionally, an additional intermediate sheet may be bonded between the two substrate sheets. The two substrate sheets form a substrate having a plurality of interior channels in combination with each other or the intermediate sheet, if there is one. If the pieces of substrate material were not previously coated with a membrane material, the substrate is coated with a dope and quenched or coagulated to form a membrane sheet.

The membrane sheet is generally planar, but with one or more ridges corresponding to the interior channels providing a surface area larger than an equivalent flat plate area. The interior channels provide open passages for permeate to flow to the edges of the sheet. A membrane sheet is preferably bonded together along one or more lines between interior channels as well as along outer edges parallel to the depressions. When bonded together between a sufficient number of interior channels, optionally on each side of each interior channel, the membrane sheet can be used without a four-sided frame and can be mechanically cleaned by backwashing.

A plurality of membrane sheets may be placed side by side in a bundle. Permeating edges of the membrane sheets, which intersect with and are open to one or more of the interior channels, may be separated from the edges of adjacent membrane sheets in the bundle by spacers. The bundle is connected to one or more headers to produce a module. The connection to a header may be permanent or removable. A plurality of modules can be assembled into a cassette. The cassette may hold the modules in a tank of water to be filtered such that the membranes are generally vertical and the interior channels are generally horizontal. Permeate flows to the headers, which are at the sides of the cassette. The liquid being filtered, and optionally gas bubbles, flows vertically through spaces between the membranes.

DRAWINGS

DETAILED DESCRIPTION

Figure 1:
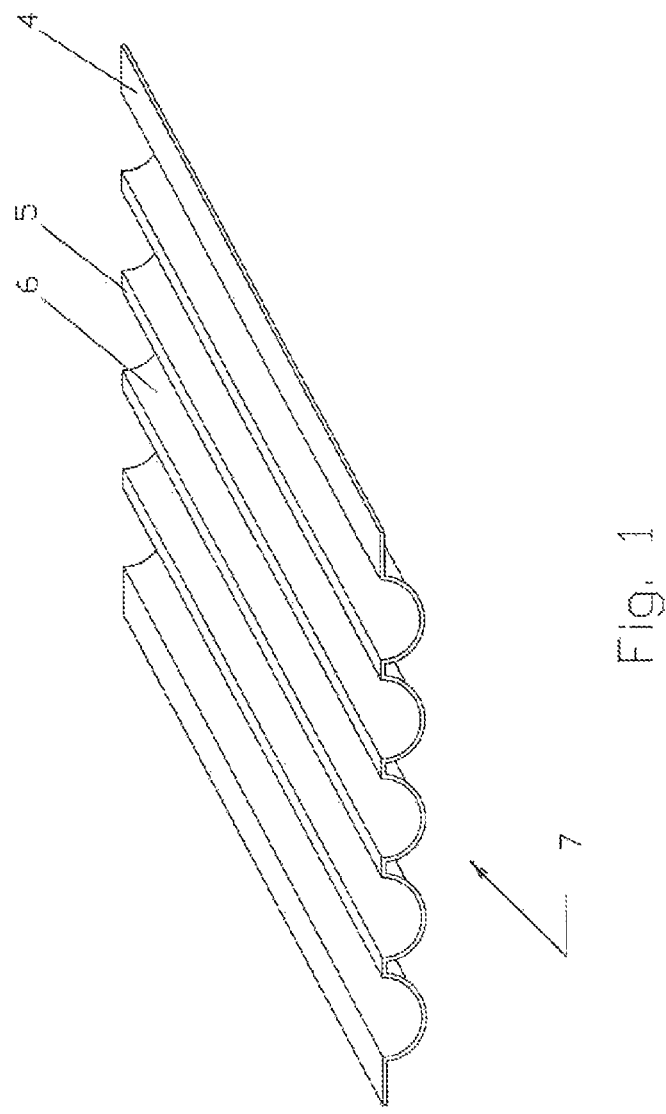
FIG. 1 is an isometric view of a formed substrate sheet.

In this specification, a "sheet" or "substrate sheet" typically refers to a piece of a substrate material, which may be shaped to have a plurality of depressions. A "permeate sheet" or a "substrate" typically refers to two sheets bonded together. A "permeate channel" typically refers to a channel on the inside of a substrate defined by the inside surfaces of the sheets, through which liquid can flow parallel to the plane of the substrate to the edge of the substrate. A "connector" may refer to a portion of a sheet between two adjacent depressions, or a portion of a permeate sheet between two adjacent permeate channels. An "insert" may refer to a part of a mold that is placed between a top and bottom die of the mold and used to shape some or all of the inside surface of a depression or a permeate channel. A "membrane sheet" may refer to a permeate sheet that has a separation layer coated on it.

In an example of a sheet and a method of making it, to be described in more detail below, a sheet is made from a piece of a non-woven material that is heat treated and pressed into a cavity to form a shape having a plurality of depressions, alternatively called ripples. In the example described herein, the depressions are separated by connectors. The connectors contact or lie in a common plane. In the example described herein, the connectors are essentially flat and the depressions are essentially semi-cylindrical. Two of these sheets are attached together at one or more, preferably all, of their connectors and at their two outer edges, alternatively called flanges, that are parallel to the depressions. This forms a permeate sheet that has an array of parallel generally cylindrical permeate channels, each channel formed by two of the semi-cylindrical ripples, one from each of the sheets. The permeate sheet has two open edges perpendicular to the channels, where the permeate channels discharge. The permeate sheet may be trimmed if necessary to a final size and shape. If the sheet was not pre-coated with a membrane material, the permeate sheet is fed into a coater where a membrane dope is cast on the outer surfaces of the permeate sheet. The coated permeate sheet then passes into a quench or coagulation bath wherein the dope is transformed into a solid membrane material having a separation layer. The membrane material may be formed by a phase separation process, for example a TIPS or NIPS process. The resulting membrane sheet is removed from the quench bath and further rinsed and impregnated (if needed) and dried. A plurality, for example between 2 and 50 membranes sheets may be attached together at their open ends according to a target inter-sheet spacing to form a bundle. At least one open end of the bundle is attached, permanently or with a removable seal, to a permeating header to form a module. The module may be integrity tested, for example by a pressure decay test. Modules are assembled into a cassette comprising structural elements to make the cassette suitable to insertion into a filtration tank. The membrane sheets are oriented generally vertically in the tank, with the channels oriented generally horizontally, and the headers located at the sides of the cassette and oriented generally vertically. The cassette preferably also has a lower aeration grid configured to discharge bubbles into spaces between the membrane sheets. The Figures, to be discussed in detail below, show an example of a sheet, a mold for making the sheet, a module and a cassette.

Referring to FIG. 1, a sheet 7 is made of a piece of a non-woven textile. The sheet 7 that has been pressed into a shape having a series of parallel semi-cylindrical depressions 6 spaced at predetermined intervals and separated by flat connectors 5. The outer depressions are bordered by two edge flanges 4. The radius of the semi-cylindrical depressions 6 may be, for example, between 0.3 mm and 50 mm depending on the application.

Figure 2:
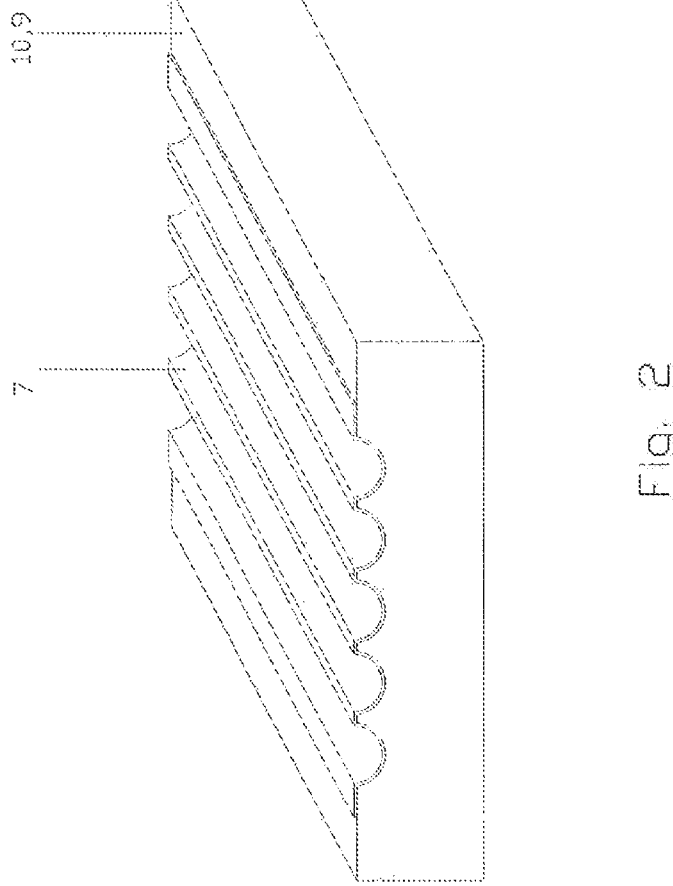
FIG. 2 is an isometric view of a substrate sheet as in FIG. 1 on the bottom cavity of a mold.
Figure 3:
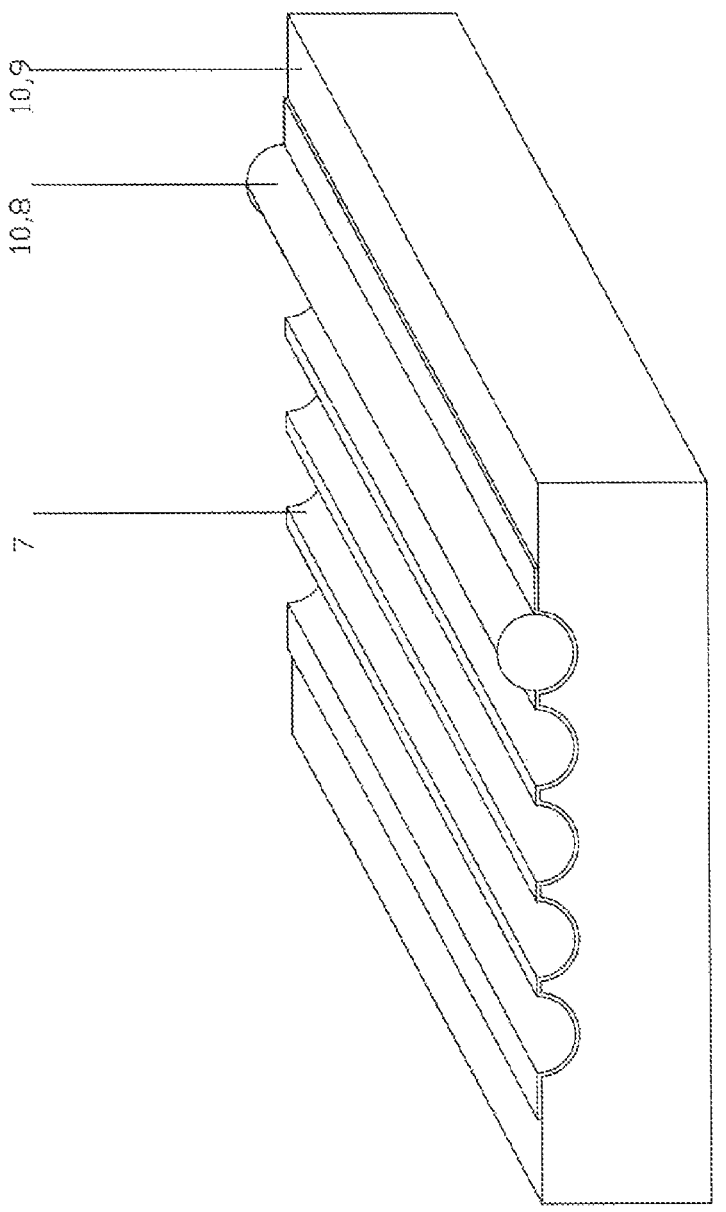
FIG. 3 is an isometric view of a substrate sheet on the bottom cavity of a mold as in FIG. 2 with a mold insert on the substrate sheet.
Figure 4:
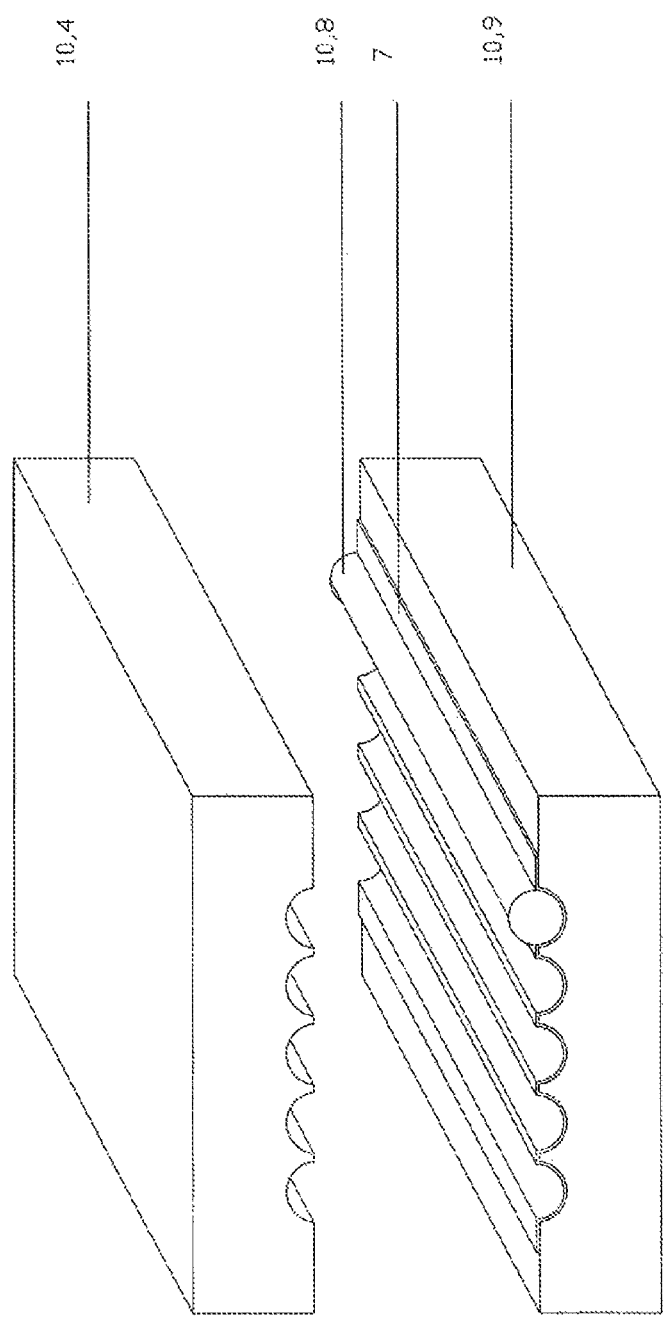
FIG. 4 is an isometric view of a substrate sheet on the bottom cavity of a mold with a mold insert on the substrate sheet as in FIG. 3 with an upper cavity of the mold.

Referring to FIGS. 2 to 4, a mold 10 comprising a bottom cavity 9, a top cavity 11, and a plurality of inserts 8 (only one shown) is used for the forming process. The bottom cavity 9 matches the outer shape of the final molded sheet 7. The inserts 8, may be metallic and are used in conjunction with the cavities 9, 11 to form the semi-cylindrical depressions 6. The inserts 8 can be separate components of the mold 10 or built into the top cavity 11 of the mold 10. When the mold has built in inserts 8, they can be fixed or have the capability of freely rotating. Rotating or detached inserts 8 allows for sliding of the non-woven substrate material during a mold closing step. Highly polished (mirror finish) materials are used for the two cavities 9, 11 of the mold and the inserts 8. A piece of initially flat non-woven substrate is loaded onto the bottom cavity 9 of the mold (FIG. 2). This piece is initially cut to pre-determined dimensions. After loading the piece of substrate, the inserts 8 are placed on the piece of substrate (if they are not built into the top cavity 11) and the top cavity 11 is placed over the inserts 8. The mold 10 is then closed and pressure is applied between the cavities 9, 11, for example by clamping them together. The top cavity 11 and inserts 8 thereby press the sheet 7 into the bottom cavity 9.

The top cavity 11 of the prototype mold 10 has the same interior shape as the bottom cavity 9. The mold 10 shown in FIGS. 2 to 4 is capable of molding 2 sheets at the same time by inserting another piece of substrate between the inserts 8 and the top cavity 11 before closing the mold 10. Each mold cavity is preferably well machined within tight tolerances to provide good control over the thickness and the shape of the final sheet 7. In particular, over compaction of any part of the sheet 7 is undesirable. Heat is applied during the molding process. After the heating phase, the mold is cooled in a closed position until the sheet (or sheets) is capable of maintaining its shape. In this way, a sheet 7 is initially heated and then cooled both while being pressed against the inside surface of a cavity 9. The sheet 7 is preferably heated to its heat deflection temperature (HDT) or more while it is pressed against the inner surface of the cavity 9. The sheet 7 is also preferably cooled to below its HDT, and more preferably below its glass transition temperature (Tg), while it is pressed against the inner surface of the cavity 9. The sheet 7 thereby takes on a permanent shape having an outer surface corresponding to the inner surface of the cavity.

A non-woven fabric, for example a polyester based fabric normally used as a substrate for flat sheet UF membranes, may be used for the substrate material. Samples from different suppliers were tested using a prototype mold, including a sample from Hirose (05TH-80W), 3 grades from 3M Powell, and multiple grades from Crane Nonwovens, AWA Paper, and Ahlstrom. The substrate materials had thicknesses ranging from 80 to 120 microns, and air permeability of 5 to 15 cc per square centimeter per second. Substrate materials were dried prior to molding. The substrate materials generally have a matrix of thermally bonded short fibers and longer reinforcing fibers. All of the samples tested produced acceptable sheets 7.

Depending on the composition of the substrate, the molding temperature is at least 100 F (38 degrees Celcius) and varied in tests between 300 and 500 F (149 and 260 degrees Celcius). In comparison, the Tg of polyester is about 60 to 75 degrees Celcius, the HDT of polyester is about 170 to 177 degrees Celcius and the melting point (Tm) of polyester may be about 255 degrees Celcius, all of these temperatures being subject to variation depending on the form of the polyester. The temperature is preferably above the HDT of the matrix fibers and the reinforcing fibers, and optionally also above the melting point of the matrix fibers, but preferably below the melting point of the reinforcing fibers. The mold is heated for long enough for the substrate to assume a shape corresponding to the inner surface of the cavity 9, 11, but at a combination of time and temperature that maintains a substantial portion of the air permeability of the substrate such that a membrane dope may still penetrate and anchor to the substrate. Heat was provided by placing the mold 10 in a temperature-controlled oven. Cycle time varied between 5 and 10 minutes for heating and over 30 minutes for cooling. For production, a mold with built-in water (or other cooling agent) lines (similar to injection molding) can be expected to significantly shorten the cooling process. The mold components 9, 8, 11 are sized to produce a desired final sheet 7 thickness, for example between 0.05 to 0.1 mm. The formed sheet 7 was 0.075 mm thick when made in a first prototype mold. Some compaction is acceptable, and possibly preferable, to reduce wall thickness and increase the ability of the sheet 7 to hold a molded shape. The mold closing and holding pressures were in the range of 15 to 20 psi. A mold for a very large sheet 7 may require a higher closing pressure but can use the same holding pressure. Two sheets 7 were molded simultaneously in the first prototype mold using removable cylindrical metal inserts 8. The molded sheets 7 maintained an inner and outer radius matching the inserts 8 and cavities 9, 11 used in the mold. The radius of the inner surfaces of the depressions in the cavities 9, 11 in the prototype mold 10 was about 1.5 mm. In a second prototype mold, the radius of the inner surfaces of the depressions in the cavities was about 0.6 mm. An optimal diameter for microfiltration or ultrafiltration of water may be closer to 0.7 mm in order to maximize packing density with acceptable lumen pressure drop.

Figure 5:
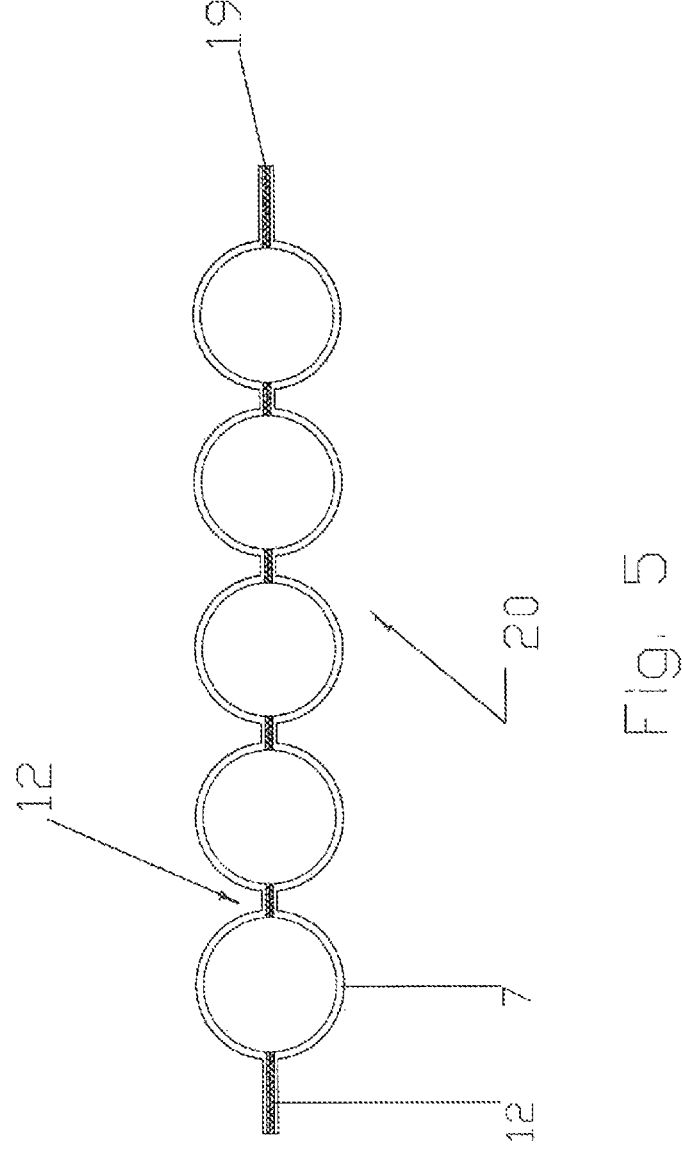
FIG. 5 is a cross section of a substrate made of two formed substrate sheets as in FIG. 1.
Figure 6:
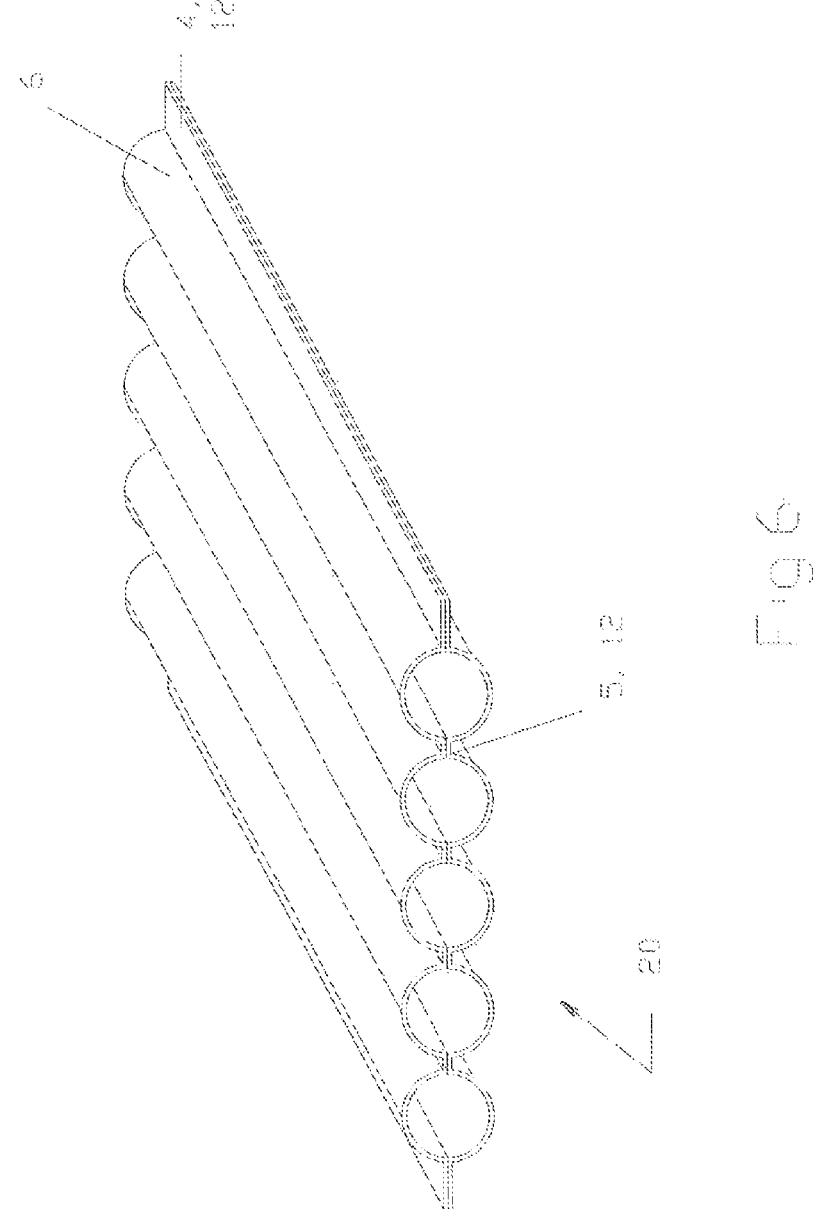
FIG. 6 is an isometric view of the substrate of FIG. 5.

Referring to FIGS. 5 and 6, after molding the sheets 7 are trimmed to final dimensions and a pair of sheets 7 are assembled into a permeate sheet 20. The sheets 7 are attached together at bonding areas 12. Sheets 7 made in the prototype mold as described above were bonded together using several types of adhesives including epoxy, water-based adhesives, and polyurethanes. The same mold 10 that was used to form the sheets 7 was used for fusing together two sheets 7. In order to eliminate sticking of the bonding areas 12 to the mold 10, and contamination of the surface that will subsequently be coated with a membrane, due to full penetration of the bonding agent through the substrate material, higher viscosity adhesives are preferred. Two sheets 7 made in the first prototype mold as described above, when fused together, created a permeate sheet 20 with cylindrical channels having a 3 mm outer diameter and a spacing between the outside diameters of about 2 mm. The overall dimension of the permeate sheet 20 were about 10 inches (25 cm) by 1½ inches (37 cm), although larger sheets 7 may be made. Two sheets 7 made in the second prototype mold created a permeate sheet 20 with cylindrical channels having a 1.2 mm outer diameter and a spacing between the outside diameters of about 1 mm. These sheets 20 were about 125 mm by 120 mm. The formed permeate sheets 20 from both prototype molds were self-supporting and maintained their shape with crisp transitions between the depressions 6 and the connectors 5.

In general, two sheets 7 can be attached together using thermoset materials like polyurethanes, epoxies or silicones or by using hot melts (thermoplastics) or other adhesives 19. The gluing process can take place in a separate gluing mold similar to the mold 10 used to form the sheets 7. First, the bottom sheet is loaded in the mold. The glue is applied using a dispenser, for example a roller or a glue printing head moved by servos controlled by a computer. Next, cylindrical inserts may be placed inside the previously molded semi-circular shapes. The outside diameter of these inserts will match the intended ID of the newly formed channels. Using the inserts is optional, but the inserts help ensure a good roundness of the permeate channels. However, the assembly process was also done in the prototype forming mold 10 without the use of its inserts 8. In this case, the process steps related to loading and removing of the inserts are obviously eliminated. A bottom sheet 7 is loaded into a bottom cavity of the mold and a top sheet 7 is loaded in a top cavity of the mold 10. After closing the mold, the two sheets will touch each other only in the bonding area. With the mold closed pressure and heat may be applied to the newly created structure if required for the adhesive used. The contact surface will be glued together forming a permeate sheet 20. Once the cycle is complete the mold is opened and the inserts are removed. The permeate sheet 20 will be removed from the gluing mold, trimmed to final dimensions if necessary and transferred to a casting machine. The sheets 7 can comprise low surface energy fibers, for example of polyethylene terephthalate (PET), which may make it difficult to achieve a strong bond. Particularly strong bonds are provided even in PET based sheets 7 by using methyl methacrylate adhesive systems (MMA), epoxies and polyurethane (PUR) hot melt adhesives.

Another option for bonding is to use thermoplastic (hot melt) wires. The wires are positioned on top of the bottom sheet centered in the bonding areas 12. The other sheet 7, loaded in the other side of the mold, will be placed on top of the first sheet. Pressure and temperature is applied until the wires melt, penetrate superficially the two sheets 7 and fuses them together. As described before the process can be done with or without the use of inserts.

A third assembly method that can be used is sonic, friction or laser welding. Continuity of the bond along the connector is not paramount for the process since permeate flowing from one channel to another does not create contamination. Laser welding with a black PTFE backing plate behind the bonding areas 12, or with a near infrared absorbing welding material such as Clearweld™ system sold by Gentex Corporation between the sheets 7, provides a particularly strong bond.

For increased permeate sheet active surface and structural strength of the permeate sheet 20 a different assembly method can be used. A thin porous material may be placed between the two sheets prior to the assembly process. This permeate carrier media will allow the liquid permeating through the membrane in the connectors 6 area to flow between the two sheets 7 in the binding area 12 into the permeate channels and into the permeate headers. Welding or an adhesive can secure the two sheets together (via the porous material) and give structural strength to the permeate sheet 20 during the backwashing process. However, such a porous material is merely optional. It is not necessary for permeate to flow between one permeate channel and another, and some permeate may flow from the connector area into a permeate channel even in the absence of a porous material. Optionally, particularly if the membrane sheet will not be backwashed but possibly even if it will be backwashed, a welded or adhesive attachment between sheets 7 or between sheets 7 and an intermediate material may be discontinuous, for example in the form of a series of adhesive dots along the connectors 5, to allow the area of the connectors 5 to pass more permeate.

For additional strength, a permeate sheet 20 may optionally have a rigid insert sandwiched between the two sheets 7 on the edges 4 or on one or more of the connector areas 5, or both. The reinforcement is added during the assembly process previously described. The rigid inserts are made of very thin, high tensile strength materials, preferable plastic materials with or without reinforcement. They will compensate for stresses generated by weight increase during field operations when the permeate sheet is installed with the permeate channels in a horizontal position. The orientation of the sheets in a module will be determined by the type of application, hydraulic calculations and the type of process used for fouling protection and cleaning protocols. Additional reinforcements can be placed in the center of the permeate sheet 20 or in other locations throughout the permeate sheet 20.

Figure 15:
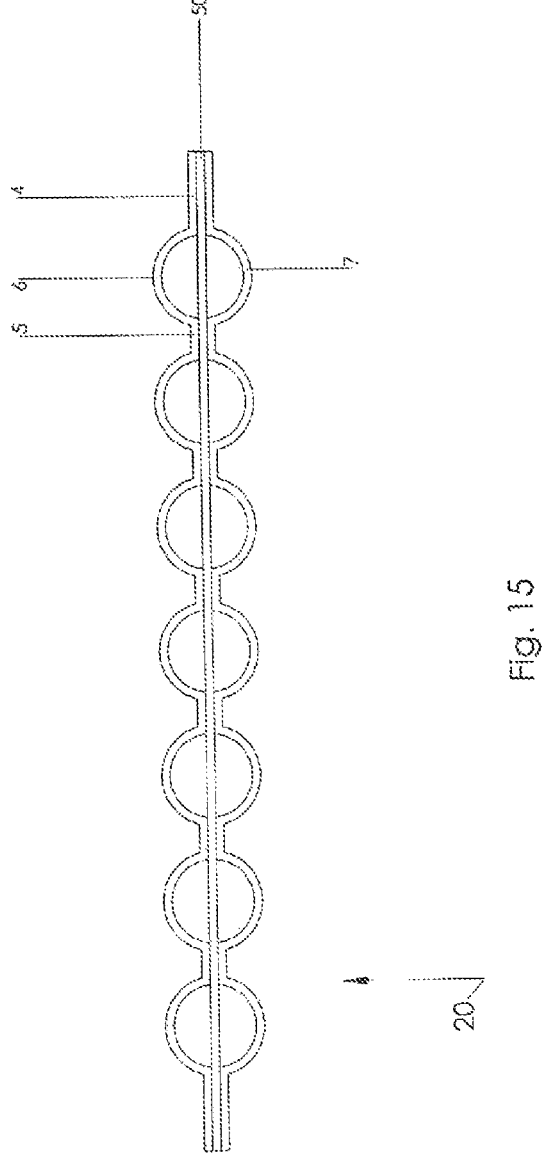
FIG. 15 is a side view of a permeate sheet having an intermediate flat sheet between two substrate sheets.
Figure 16:
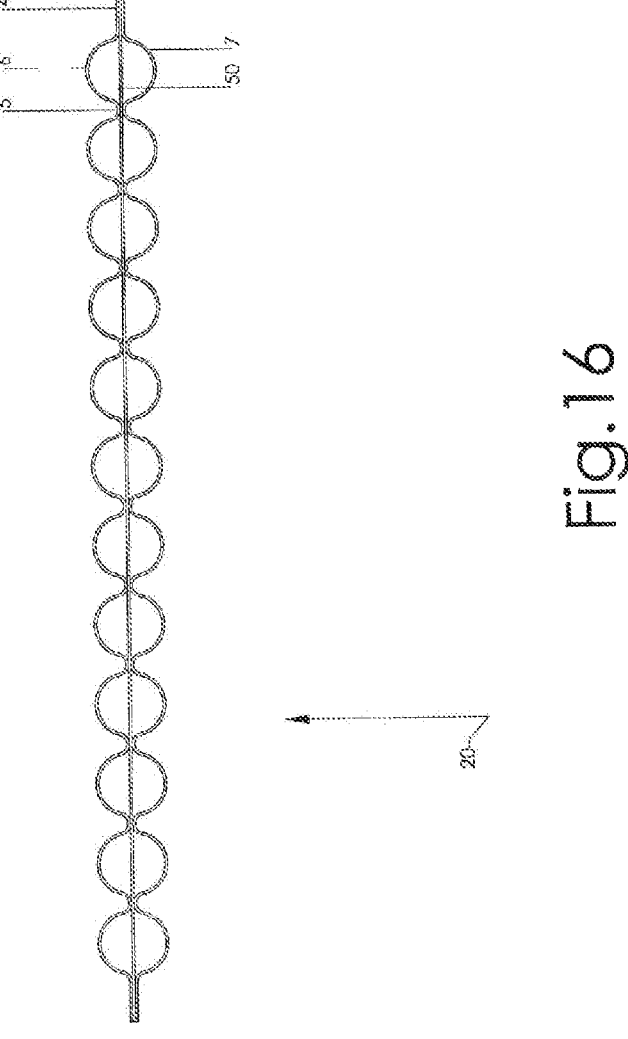
FIG. 16 is a side view of a permeate sheet made with substrates having an undulating profile.

As shown in FIG. 15, another option is to provide an intermediate material or insert by way of a sheet form insert 50 between the entire area of two sheets 7, thus creating two semi-cylindrical permeate channels for every one cylindrical permeate channel that would be formed without the insert 50. This insert 50 may be rigid to reinforce the sheets 7 as described above, or may be permeable to increase the activity of the connector 5 area of the sheets 7 as described above. The insert 50 may also be used, whether rigid or not and whether porous or not, to enable attaching the sheets 7 together. An adhesive or weld enhancing material may be applied, for example sprayed in a thin layer or printed as lines or a grid of dots, on both sides of the insert 50. Placing the insert 50 between two sheets 7 thus provides an alternate method for applying an adhesive or weld enhancing material to the connectors 5. Whether or not an adhesive is pre-applied, the insert 50 may also help provide a secure bond between sheets 7 if there is not a crisp distinction between the depressions 6 and the connectors 5, for example if the sheets 7 have an undulating shape as shown in FIG. 16. The insert 50 may be, for example, a solid film, for example of mylar, or a non-woven sheet such as a three dimensional matrix of polyamide (PA, nylon) fibers.

Figure 7:
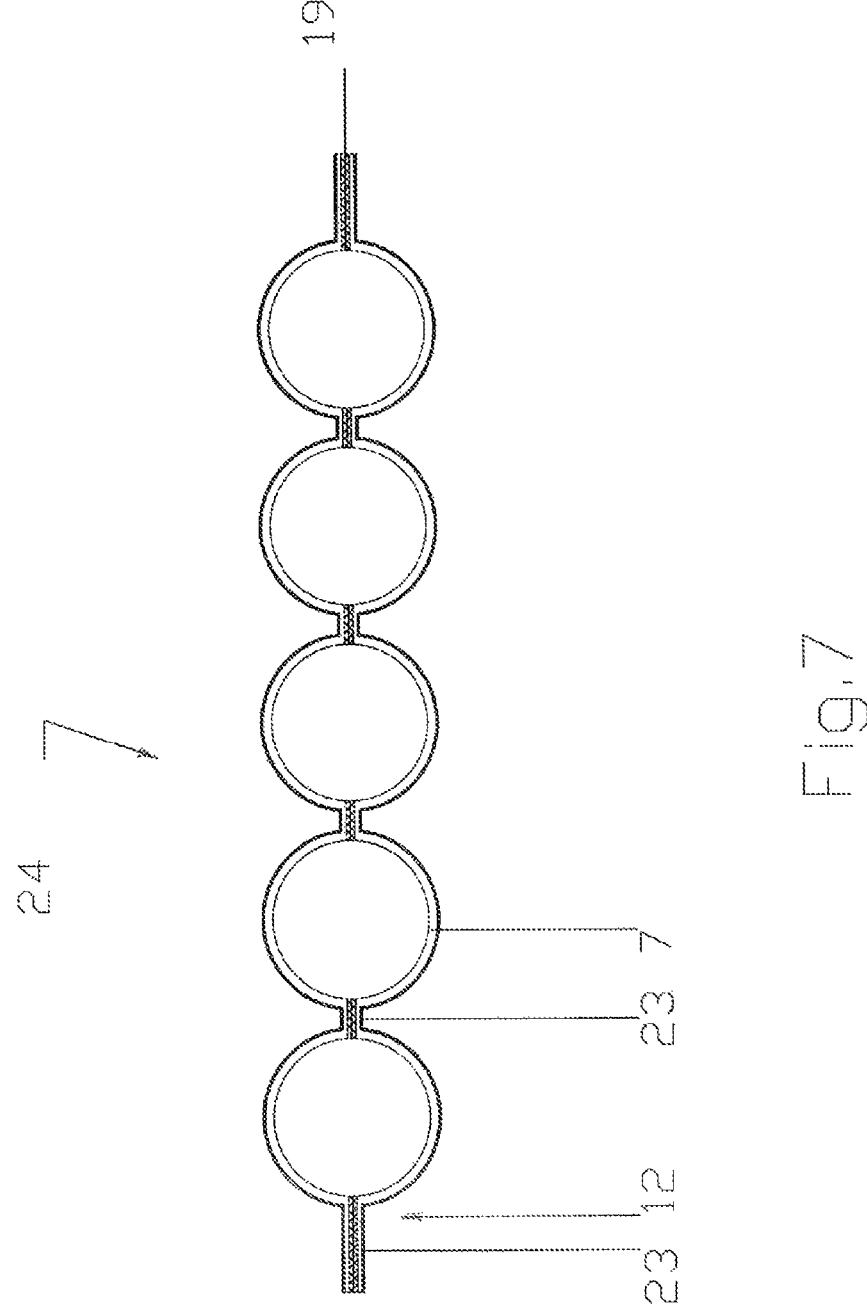
FIG. 7 is a cross-section of a membrane having a semi-permeable coating on a substrate as in FIG. 5.

After the permeate sheet 20 is formed, a polymeric membrane dope is cast on both faces. This can be done simultaneously for both sides or sequenced (one side at a time). The permeate sheet 20 is passed through a casting device that applies the dope. The casting device has a die, analogous to the spinneret of a hollow fiber coating device, with a shape corresponding to the outer shape of the permeate sheet 20. The dope is brought to the casting device when the permeate sheet 20 is present using gas pressure or a metering gear pump. The speed and the thickness of dope layer applied is controlled. Other process parameters like dope viscosity, temperature, and internal pressures inside the casting device are also controlled. The casting device has a shape matching the outside shape of the permeate sheet 20. The permeate sheet 20 is fed to the casting device vertically or horizontally, however vertical feeding reduces the tendency of dope to flow towards the binding areas 12. The exit of the casting device leads to a gap to allow the dispersion of the dope on to the permeate sheet 20 at a generally constant thickness. Subsequently the coated permeate sheet 20 passes through coagulation and rinse baths. This process will form a solid membrane layer 23 on top of the permeate sheet 20 by way of a phase inversion membrane formation process as shown in FIG. 7 to produce a membrane sheet 24. Membrane sheets 24 are then rinsed, impregnated (UF only) and dried in an offline process. Membrane sheets 20 made in the first prototype mold were coated with polysulfone in a layer of about 140 microns thick. The polysulfone impregnated the permeate sheet 20 but did fill the interior permeate channels of the membrane sheet 24.

Alternately, a membrane sheet 24 can also be made by forming a membrane on a substrate sheet before making a sheet 7. A flat sheet membrane can be cast on a regular casting machine. The flat sheet membrane is then formed in the mold 10 into a molded membrane sheet and assembled together with another such sheet into a membrane sheet 24. The molding process will have a different cycle time and use different process parameters.

Figure 8:
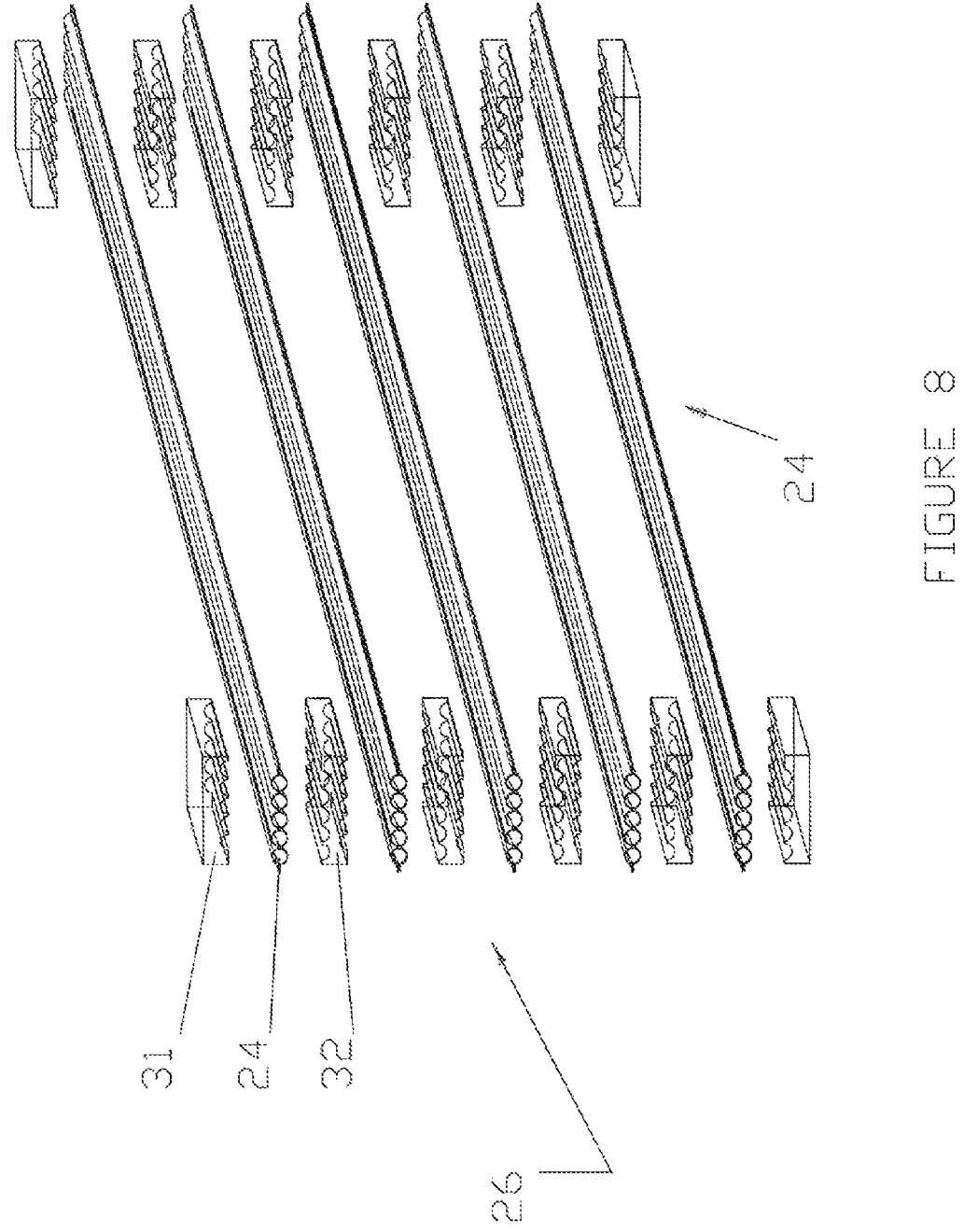
FIG. 8 is an exploded isometric view of a plurality of membranes as in FIG. 7 being assembled into a bundle.
Figure 9:
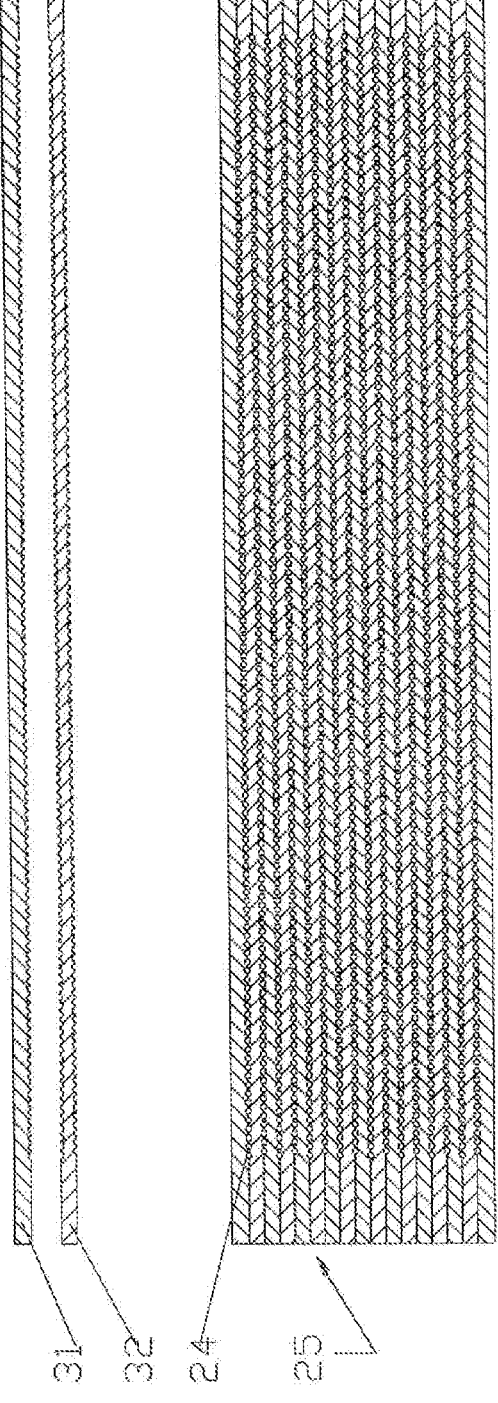
FIG. 9 is an end view of a membrane bundle.
Figure 10:
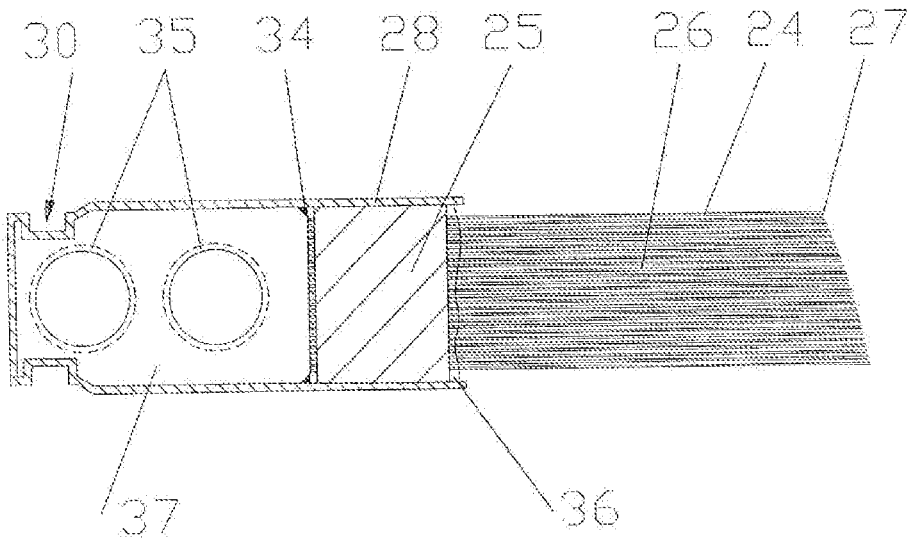
FIG. 10 is a cross section of a membrane bundle potted at one end into a permeate header.

Referring to FIGS. 8, 9 and 10 several membrane sheets 24 can be combined to form a bundle 26. While any number of membrane sheets 24 can be used, a preferred range is 15-50 based on desired inter-sheet spacing gaps and limits on plastic header molding. A bundle 26 can be potted in a plastic header molding 28 using a resin such as polyurethane according to conventional methods such as fugitive static potting or centrifuge potting with cutting to open the channel ends. An alternate potting method, as shown in FIGS. 8, 9 and 10 is to use plastic inserts 31, 32 to attach the membrane sheets 24 together into a potting block or brick 25 that can then be inserted into a seat in a header molding 28. Optionally, a plurality of membrane sheets 24 may be laid in series between two inserts 31, 32. For example, inserts 31, 32 that are about 1 m long may hold 4 membrane sheets 24, each of which is about 25 mm high. Further optionally, a porous divider 34 may define a bottom of the seat. The block 25 is potted into place by pouring a resin 36 into the header seat over the block 25. Permeate flows through the channels, exits the block 25 through open ends of the channels, flows through the divider 34 if any, and into a permeate receptacle 37 in the header 28. Permeate can be removed from the permeate receptacle 37 through a permeate spigot 25.

Figures 11, 12:
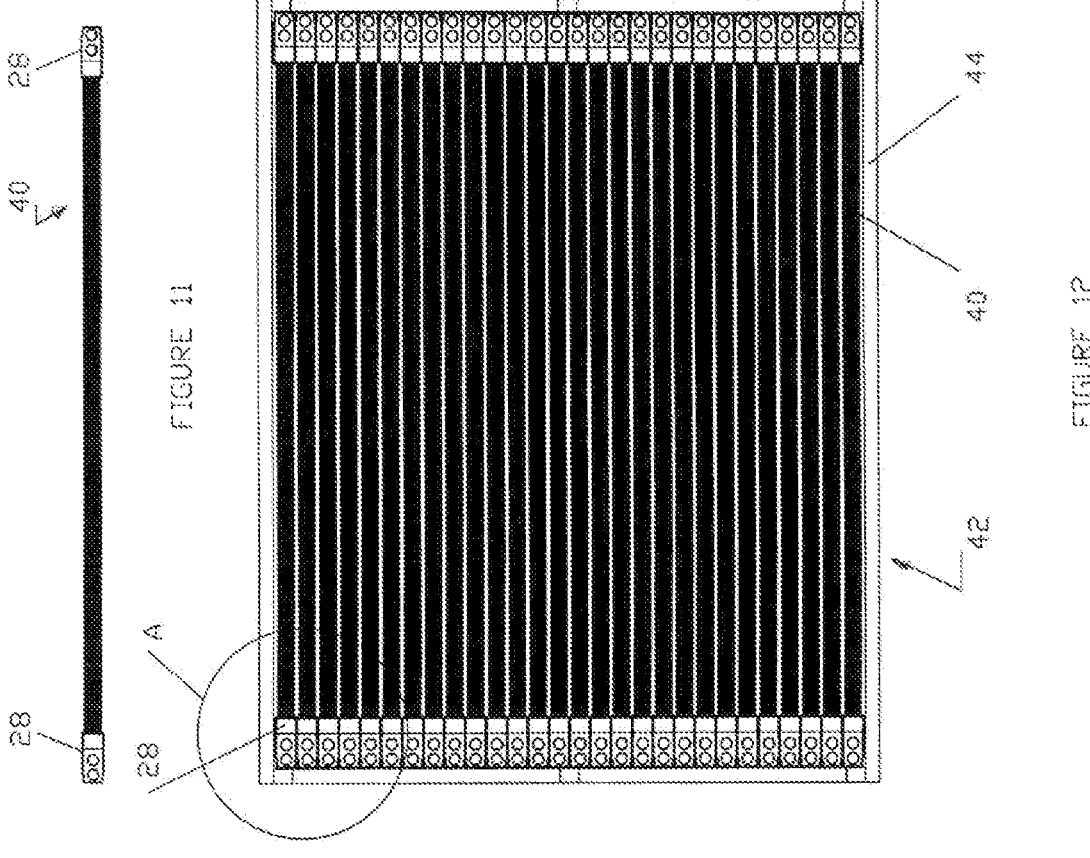
FIG. 11 is a top view of membrane module having a membrane bundle potted into permeate headers at both ends.
FIG. 12 is a top view of a cassette having a plurality of the modules of FIG. 11.
Figure 13:
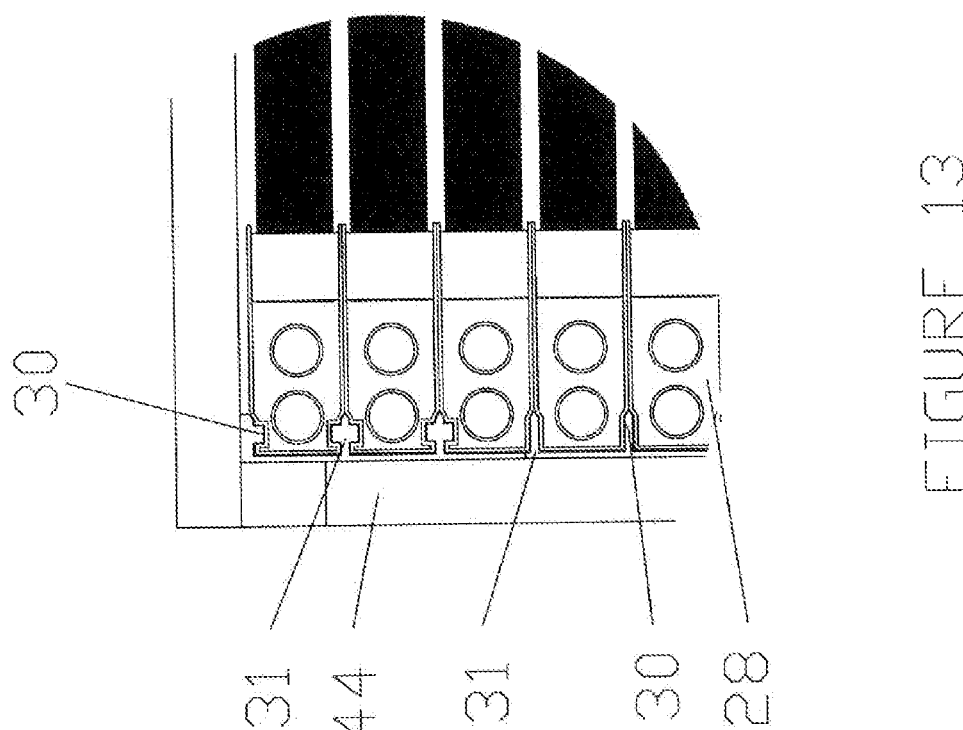
FIG. 13 is an enlarged view of a corner of the cassette of FIG. 12.
Figure 14:
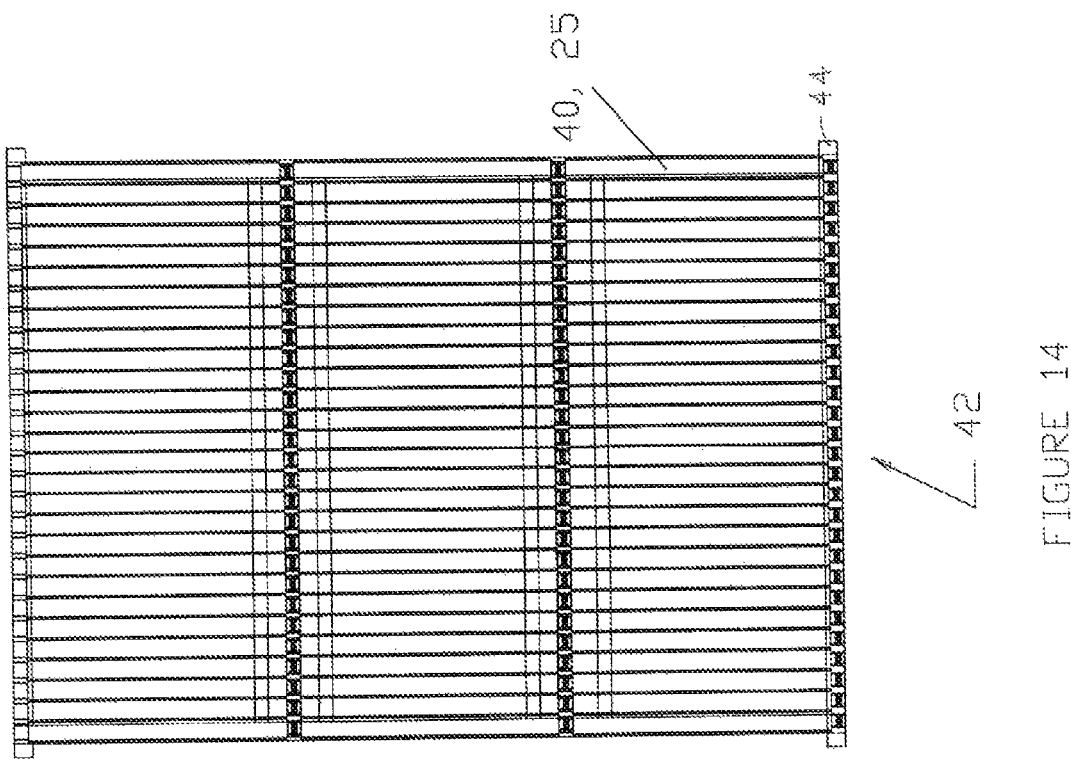
FIG. 14 is a side view of the cassette of FIG. 12.

FIG. 11 shows a module 40. The black area between the two permeate headers 40 represents a bundle 26 of membrane sheets 24 spaced by gaps 27 as shown in more detail in FIG. 10. The membrane sheets may be separated by a center to center distance of, for example, between 0.5 cm and 5 cm. Optionally, the membrane sheets 24 may be staggered relative to each other, with the ripples of one located across from the connectors of another. FIG. 12 shows a top view of a cassette 42 having several modules 40 contained within a frame 44. A permeate header (not shown) is connected to the permeate spigots 35 of the modules 40. The frame 44, headers 28 and, optional permeate pipes if any, are located at the sides of the cassette 42 so that fluids can travel upwards through the gaps 27. Modules 40 can be stacked with the permeate spigot 25 of one module 40 plugging into the permeate receptacle 37 of an upper or lower module 40. In FIG. 14, for example, three modules 40 are stacked together in a vertical column. Referring to FIG. 13, the frame 44 of the cassette 42 holds sliders 31 that correspond in shape and size to the alignment grooves 30 of the headers 28 to assist in placing the modules 40 in position in the cassette 42.

Another option is to not use a molded plastic header but to use the block as a finished element, potentially with a plastic guide attached to its perimeter, for direct insertion into a permeate cavity of a header or the cassette. A removable seal between the block and the permeate cavity is made by compressing the block into the permeate cavity, or by a sealing means such as an O-ring. Advantages of this method include less active fiber blocked by urethane, less manufacturing scrap from potting, increased cassette packing density, reduced raw material cost (header plastic and urethane), easy repair of channels in the field by pinning open channel ends after releasing them from the permeate cavity, and reduced replacement module costs.

Under the no-header design, fiber bundle blocks will be directly inserted into a cassette composed of a steel frame with molded plastic ends that serve both as headers with double o-rings and permeate collection channels. 1 meter high elements could be stacked in any number in order to fill up any size tank. Bundles would be tapered by having an increasingly thin layer of thermoplastic at the end where there are minimal stresses and channels are non-permeating to allow for an easier fit into headers and to allow for bundles to be spaced together more closely. The thermoplastic would be thicker near the top to allow for a restrainer bar to be placed across all modules for security. The system will be adjustable in case of shrinkage.

By providing molded permeate channels inside a permeate sheet 20, the distribution of active surface inside the filtration tank can be precisely controlled. Further, the precision molded permeate channels allow for a membrane wall thickness of 0.3 mm or less, or 0.15 mm or less, which is less than for a reinforced hollow fiber membrane. The outer diameter of the permeate channels may be 1 mm or less, or 0.5 mm or less. In a calculated example, the channels have an outside diameter of 0.7 mm, and a membrane wall thickness of 0.15 mm. The permeate channels would have an internal diameter of 0.4 mm, which would be sufficient for high volume permeate flow without significant pressure drop to permeate flow through the permeate channels in a membrane sheet that is 1 m wide.

The membrane sheet has a significantly increased surface area relative to a typical flat sheet membrane, avoids the frame components and spacers that are necessary in typical flat sheet modules, and the rigidity of the membrane sheets 24 allows for a larger area (referring to the external dimensions of the sheet rather than its membrane surface area) per sheet. The membrane sheets 24 may undulate or vibrate when aerated, but there is little or no abrasion between adjacent membranes as in hollow fiber systems. All permeate channels are precision placed within a sheet and sheets can be precision placed with respect to each other, allowing a packing density of up to 50%. Tank and module packing density are at least comparable to hollow fiber systems.

Vertically oriented sheets, with headers at the sides of the sheets, allow for an aeration grid to channel air between sheets with no top or bottom header to block flow. Because air is directed between each sheet and forced to travel upward, the issue of fouling in dead zones within hollow fiber bundles is removed. However, unlike typical flat sheet membranes, having only two headers allows some vibration of the membrane sheets to help prevent sludging that may occur at the membrane surface. Yet the well-defined vertical gaps between membranes fosters plug-flow through the gaps, which reduces average solids exposure and creates well defined paths for solids drainage during tanks drains.

While hollow fiber membranes are limited to polymers that can be extruded with the right flexibility, strength, and casting properties, flat sheet casting allows for more rigid, pH resistance polymers such as polysulfone to be used without suffering disadvantages due to polysulfone rigidity. The permeate sheets may also be coated with thin-film composites such as NF membrane materials, which allows for an immersed NF filter and bioreactor. New nanostructured membrane materials, for example using carbon nanotubes, aquaporins, masked etching, or other novel processes, may also be suitable for being formed on a permeate sheet.

U.S. provisional patent application No. 61/325,972 is incorporated herein by this reference to it.

We claim:

1. A device comprising,
two sheets of a substrate material, at least one of the sheets of substrate material having depressions defined by its inner surface, the depressions extending to an edge of the at least one of the sheets of substrate material, the two sheets of substrate material having their inner surfaces bonded to a sheet form insert along outer edges of the two sheets, and along one or more lines between the depressions of the at least one of the sheets, wherein the outer surfaces of the two sheets of substrate material are coated with a filtration membrane material,
whereby the depressions form internal channels between the two sheets of substrate material, the internal channels being open to at least one of the outer edges of the at least one of the sheets of substrate material.

2. The device of claim 1 wherein the filtration membrane material has a pore size in the microfiltration range or smaller.

3. The device of claim 1 wherein the depressions are generally semi-cylindrical in cross section and separated by generally flat portions of the substrate material.

4. The device of claim 1 wherein the substrate material is a non-woven textile.

5. The device of claim 1 wherein the two sheets of a substrate material are bonded to the insert by a thermoplastic or a resin, or by welding.

6. The device of claim 1 wherein the insert is between the entire area of the two sheets.

7. The device of claim 1 wherein the insert is a non-woven sheet.

8. The device of claim 1 wherein the internal channels are permeate channels.

9. The device of claim 1 wherein the insert is a solid film.

10. The device of claim 7 wherein the insert is a non-woven sheet of a three dimensional matrix of polyamide (PA, nylon) fibers.

11. The device of claim 1, wherein the insert is a rigid insert.

12. The device of claim 9 wherein the solid film is a solid film of mylar.

13. The device of claim 1 wherein the insert is porous.

14. The device of claim 5, wherein the welding is laser welding.

15. A filtration module comprising a bundle of a plurality of the device of claim 1.

16. The filtration module of claim 15 wherein edges of the devices that are open to the one or more internal channels are potted into a header.

17. The filtration module of claim 16 wherein the internal channels are generally parallel to each other and generally perpendicular to the header.

18. The filtration module of claim 16 wherein the header is mounted in a cassette frame adapted to hold the filtration device in a tank with the header oriented vertically, the internal channels oriented horizontally, and with vertical gaps between adjacent devices.

19. The filtration module of claim 15 wherein a filtration membrane material is coated on outer surfaces of the device.

\* \* \* \* \*